(12) United States Patent
Li (10) Patent No.: US 11,915,049 B2
(45) Date of Patent: Feb. 27, 2024

(54) METHOD AND APPARATUS FOR SCALING A CUSTOM RESOURCE WITH CUSTOM METRICS IN A CONTAINERIZED APPLICATION HANDLING SYSTEM

(71) Applicant: VMware, Inc., Palo Alto, CA (US)

(72) Inventor: Fangyuan Li, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 162 days.

(21) Appl. No.: 16/953,202

(22) Filed: Nov. 19, 2020

(65) Prior Publication Data

US 2022/0156129 A1 May 19, 2022

(51) Int. Cl.
*G06F 9/50* (2006.01)
*G06F 9/455* (2018.01)
*G06F 9/54* (2006.01)

(52) U.S. Cl.
CPC ............ *G06F 9/50* (2013.01); *G06F 9/45558* (2013.01); *G06F 9/542* (2013.01); *G06F 2009/4557* (2013.01)

(58) Field of Classification Search
CPC .................. G06F 9/542; G06F 9/45558; G06F 2009/4557
See application file for complete search history.

(56) References Cited

U.S. PATENT DOCUMENTS

| | | | |
|---|---|---|---|
| 9,471,349 B1 * | 10/2016 | Stone | G06F 9/5061 |
| 10,761,889 B1 * | 9/2020 | Jain | G06F 9/5005 |
| 11,075,792 B2 * | 7/2021 | Deshmukh | H04L 41/0213 |
| 2019/0098082 A1 * | 3/2019 | Hansen | H04L 67/1097 |
| 2019/0163559 A1 * | 5/2019 | Takahashi | G06F 11/14 |
| 2019/0179720 A1 * | 6/2019 | Chen | G06F 9/455 |
| 2020/0250006 A1 * | 8/2020 | Parekh | H04L 67/1008 |
| 2021/0081292 A1 * | 3/2021 | Jmt | G06F 3/0617 |
| 2021/0406035 A1 * | 12/2021 | Price | G06F 11/3055 |
| 2021/0409346 A1 * | 12/2021 | Thoemmes | H04L 47/762 |

OTHER PUBLICATIONS

Kubernetes, "Production-Grade Container Orchestration", https://kubernetes.io/, downloaded Nov. 19, 2020, 6 pgs.
Kubernetes, "Custom Resources", https://kubernetes.io/docs/concepts/extendkubernetes/api-extension/custom-resources/, downloaded Nov. 19, 2020, 7 pgs.

(Continued)

*Primary Examiner* — Jacob D Dascomb
(74) *Attorney, Agent, or Firm* — King Intellectual Asset Management (57) ABSTRACT

A method and apparatus for autoscaling a custom resource of a containerized application handling system utilizes a metric value defined for a system object of the custom resource to scale the system object of the custom resource. An API request for the metric value is sent from an autoscaler to a control plane of the containerized application handling system to receive the metric value, which is compared to a desired metric value. A target scale metric value is then determined based on the comparison and posted in a database of the containerized application handling system. The system object of the custom resource is scaled by an operator of the containerized application handling system based on the posted target scale metric value.

20 Claims, 4 Drawing Sheets

(56) References Cited

OTHER PUBLICATIONS

Github, Horizontal Pod Autoscaling:, https://github.com/kubernetes/community/blob/master/contributors/design-proposals/autoscaling/horizontal-pod-autoscaler.md#/scale-subresource, downloaded Nov. 19, 2020, 6 pgs.

Kubernetes, "kubernetes autoscaling/v1", https://github.com/kubernetes/api/blob/master/autoscaling/v1/types.go#L 114-L147, downloaded Nov. 19, 2020, 12 pgs.

VMware, Inc. "VMware and Pivotal Launch Pivotal Container Service (PKS) and Collaborate with Google Cloud to Bring Kubernetes to Enterprise Customers.", Aug. 29, 2017, 4 pgs.

Redhat, "What is container-native virtualization", https://www.redhat.com/en/resources/container-nativevirtualization, downloaded Nov. 19, 2020, 5 pgs.

Kubernetes, "Horizontal Pod Autoscaler with Arbitrary Metrics", https://github.com/kubernetes/community/blob/master/contributors/design-proposals/autoscaling/hpa-v2.md, downloaded Nov. 19, 2020, 6 pgs.

Berman, Scott, "Autoscaling Kubernetes Custom Resource using the HPA", https://medium.com/@thescott111/autoscaling-kubernetes-customresource-using-the-hpa-957d00bb7993, downloaded Nov. 19, 2020, 8 pgs.

Kubernetes, "Config Connector Overview", https://cloud.google.com/configconnector/docs/overview, downloaded Nov. 19, 2020, 2 pgs.

Kubernetes, "Generating CRD", https://book-v1.book.kubebuilder.io/beyond_basics/generating_crd.html, downloaded Nov. 19, 2020, 2 pgs.

Kubernetes, "Support arbitrary subresources for custom resources", Issue #72637, https://github.com/kubernetes/kubernetes/issues/72637, downloaded Nov. 19, 2020, 12 pgs.

Kubernetes, "Breaking: VMware Announces Intent to Acquire Heptio to Drive Kubernetes Across Multiple Clouds", https://www.vmware.com/radius/intent-to-acquire-heptio/, downloaded Nov. 19, 2020, 2 pgs.

Chiang, Eric, "TPR Is Dead! Kubernetes 1.7 Turns to CRD", https://coreos.com/blog/custom-resource-kubernetes-v17, Jun. 26, 2017, 7 pgs.

Colbert, Kit, "Introducing Project Pacific", https://blogs.vmware.com/vsphere/2019/08/introducing-project-pacific.html, posted Aug. 26, 2019, 12 pgs.

Hightower, Kelsey, "Kubernetes is a platform for building platforms. It's a better place to start; not the endgame"., https://twitter.com/kelseyhightower/status/935252923721793536?lang=en, posted Nov. 27, 2017, 2 pgs.

Levy, Nat, "Amazon Web Services approaches $9B in quarterly revenue, but growth slows again, missing analyst expectations" 2019. https://www.geekwire.com/2019/amazon-web-services-growthslows-missing-analyst-expectations/, Oct. 24, 2019, 4 pgs.

Philips, Brandon, "Introducing Operators: Putting Operational Knowledge into Software", https://coreos.com/blog/introducingoperators.html, Nov. 3, 2016, 9 pgs.

Pytel, Maciej, "External Metrics API", https://github.com/kubernetes/community/blob/master/contributors/esignproposals/instrumentation/external-metrics-api.md, downloaded Nov. 19, 2020, 3 pgs.

Raghunath, Nikhita, "Kubernetes Custom Resources Grow up in v1.10", https://blog.openshift.com/kubernetes-custom-resourcesgrow-up-in-v1-10/, Apr. 11, 2018, 8 pgs.

Github, "Custom Metrics API", https://github.com/kubernetes/community/blob/master/contributors/designproposals/instrumentation/custom-metrics-api.md, downloaded Nov. 19, 2020, 6 pgs.

Github, "Resource Metrics API", https://github.com/kubernetes/community/blob/master/contributors/designproposals/instrumentation/resource-metrics-api.md, downloaded Nov. 19, 2020, 4 pgs.

Tune, Eric, "Growth and Design Patterns in the Extensions Ecosystem", https://www.youtube.com/watch?v=ph4a9TzK29U&feature=youtu.be, 2019, 1 pg.

Wikipedia, "Xirang", https://en.wikipedia.org/wiki/Xirang, downloaded Nov. 19, 2020, 2 pgs.

\* cited by examiner

METHOD AND APPARATUS FOR SCALING A CUSTOM RESOURCE WITH CUSTOM METRICS IN A CONTAINERIZED APPLICATION HANDLING SYSTEM

BACKGROUND

The Kubernetes® (K8s) platform is an open source system for automating deployment, scaling, and management of containerized applications. A Kubernetes server system groups containers that make up an application into logical units for easy management and discovery. A Kubernetes server system can support data center outsourcing to public cloud service providers or can be used for web hosting at scale. Server and mobile applications with complex custom code can be deployed using the Kubernetes platform on commodity hardware to lower the costs on application provisioning with public cloud hosts and to optimize software development processes. The Kubernetes platform was made open source in 2014. The Kubernetes community continues to improve systems, structures, and practices and large cloud providers have adopted the Kubernetes system.

Maintaining an infrastructure for a Kubernetes system generally involves observing and compensating for interactions between a monitoring system, the infrastructure in use with applications running on it, and the actions of users. After the infrastructure is deployed, a Kubernetes system must be configured to operate well with the given hardware under different loads. System administrators dig deep into failures and monitor multiple systems to determine system bottlenecks and address direct causes of slow operation and even failure. Manual maneuvers based on the observations smoothly scale the resources allocations up or down.

SUMMARY

A method and apparatus for autoscaling a custom resource of a containerized application handling system utilizes a metric value defined for a system object of the custom resource to scale the system object of the custom resource. An API request for the metric value is sent from an autoscaler to a control plane of the containerized application handling system to receive the metric value, which is compared to a desired metric value. A target scale metric value is then determined based on the comparison and posted in a database of the containerized application handling system. The system object of the custom resource is scaled by an operator of the containerized application handling system based on the posted target scale metric value.

A method for autoscaling a custom resource of a containerized application handling system in accordance with an embodiment includes sending an API (Application Programming Interface) request from an autoscaler to a control plane of a containerized application handling system for a metric value defined for a system object of the custom resource of the containerized application handling system, receiving the metric value of the custom resource from the control plane in response to the API request, comparing the received metric value to a desired metric value, determining a target scale metric value defined for the system object in the custom resource based on the comparing by the autoscaler, posting the determined target scale metric value of the custom resource to a database of the containerized application handling system, and scaling the system object of the custom resource by an operator of the containerized application handling system based on the posted target scale metric value. In some embodiments, the steps of this method are performed when program instructions contained in a computer-readable storage medium are executed by one or more processors. An apparatus in accordance with an embodiment includes memory, and at least one processor configured to send an API (Application Programming Interface) request from an autoscaler to a control plane of a containerized application handling system for a metric value defined for a system object of a custom resource of the containerized application handling system, receive the metric value of the custom resource from the control plane in response to the API request, compare the received metric value to a desired metric value, determine a target scale metric value defined for the system object in the custom resource based on the comparing by the autoscaler, post the determined target scale metric value of the custom resource to a database of the containerized application handling system, and scale the system object of the custom resource by an operator of the containerized application handling system based on the posted target scale metric value.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments presented herein relate to systems and methods for network topology construction. In this specification, the terms "logical network entity," "logical network element," and the like will refer to software-defined networking (SDN) logical overlay network features. The terms, "virtual entities" and the like will refer to software-implemented networking services that reside in a distributed manner on a plurality of physical host computers and may handle logical overlay or physical underlay network traffic. In so doing, virtual entities, which include software-implemented switches, routers, tunnel endpoints, network filters/firewalls, etc., implement policies for the overlay software-defined network.

The Kubernetes (K8s) architecture for a server system is designed to be highly extensible and modular with all of the major components well interfaced and abstracted. Members of the open source community continue to propose and implement extension primitives to serve their own needs. These extension primitives include operator primitives and custom resource primitives. K8s operators are software extensions that make use of custom resources to manage applications and their components. K8s operators are clients of the K8s API that act as controllers for a custom resource. K8s operators may be used to deploy an application, take and restore backups of an application's state, handle application upgrades, changes, and configuration changes, and publish a service to applications that does not support K8s APIs.

K8s custom resources are extensions of the K8s API. A resource is an endpoint in the K8s API that stores a collection of API objects of a kind as defined by the definition of the custom resource. Custom resources allow an operator to store and retrieve data that is structured as defined by the custom resource. Users may define and create new custom resources using a K8s custom resource definition API. Custom resources are custom in that they are not built in to the K8s system resources as, for example, pods are.

The Kubernetes community has recently defined custom resources as similar to native K8s resources, and as having a subresources object with attributes of status and scale. The status subresource and the scale subresource are optional and are enabled using the custom resource definition API. In some embodiments described herein scale refers to a number of replicas. The replicas are running containerized applications as nodes. An autoscaler in a K8s cluster changes the scale by adding or removing replicas. The status subresource summarizes the current state of the object including utilization of processor and memory resources and configuration settings.

Figure 1:
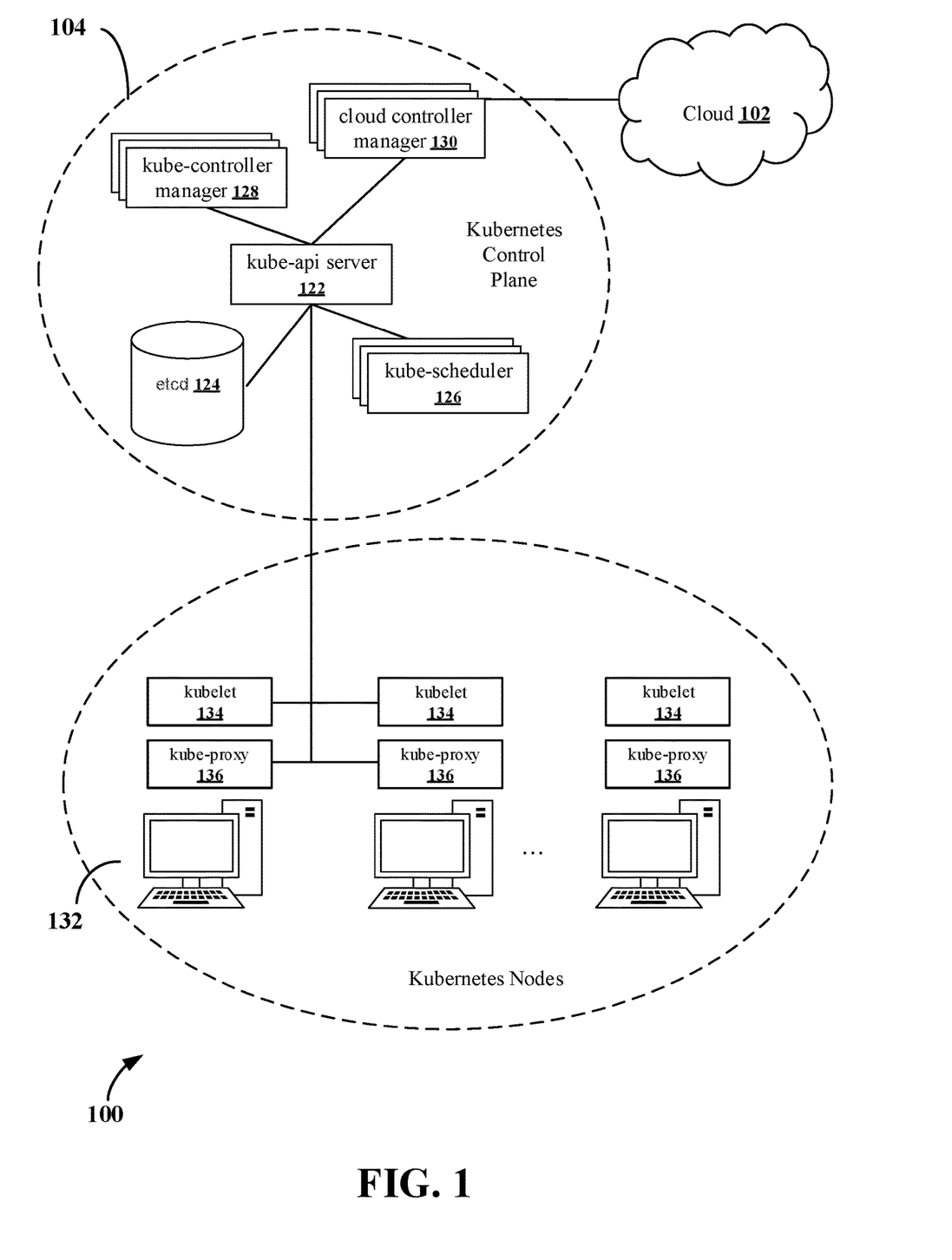
FIG. 1 is a block diagram of a containerized application handling system.

FIG. 1 is a block diagram of a Kubernetes cluster. The cluster 100 is a foundational element of a Kubernetes server system deployment, operating as a containerized application handling system. The cluster is made up of nodes 132. The nodes are all coupled to other nodes primarily through APIs (Application Programming Interfaces). The worker nodes run containerized applications by hosting pods. Pods are the components of the application workload. A K8s pod is a group of one or more containers with shared storage/network resources and a pod specification (Pod.Spec) for how to run the containers. It may be thought of as a wrapper for containers. A K8s pod's contents are co-located and co-scheduled and run in a shared context. A control plane 104 is another node that manages the worker nodes and the pods in the cluster. In some embodiments, the control plane is distributed across multiple nodes and clusters operate multiple worker nodes to improve fault-tolerance and availability. While these nodes are shown as physical objects, in some embodiments all of the nodes are abstracted resources that host pods with flexible resourcing.

The control plane 104 performs scheduling and controls the generation and deployment of Pods. The control plane detects cluster events and provides appropriate responses. The kube-api server 122 exposes the Kubernetes API as the front end for the control plane. It connects the control plane 104 to the worker nodes 132. Multiple kube-api server instances may be deployed to increase traffic capacity. The etcd 124 is a database coupled to the kube-api server 122. It is a database that serves as a key value store and is also used as the backing store for all cluster data. The kube-scheduler 126 is coupled to the kube-api server 122. It selects worker nodes to run any newly created pods. The kube-scheduler scheduling decisions may depend on individual and collective resource requirements, hardware/software/policy constraints, affinity and anti-affinity specifications, data locality, inter-workload interference, and deadlines.

The kube-controller manager 128 is coupled to the kube-api server 122. It runs controller processes such as node controllers, replication controller endpoints controllers and service account controllers. The node controller monitors worker nodes for availability and responsiveness. The replication controller maintains the number of pods for each replication controller object of the system. The endpoints controller populates the endpoints by joining services and pods. The service account controller creates default accounts and API access tokens when new namespaces are created to support new worker nodes.

The cloud controller-manager 130 is coupled to the kube-api server 122 and to the cloud 102. It embeds cloud-specific control logic. The cloud controller manager 130 provides a link to cloud providers and runs controllers specific to particular linked cloud providers, such as a node controller, route controller, and service controller. The node controller monitors availability of nodes in the cloud provider. The route controller sets up routes in the cloud provider infrastructure. The service controller creates, modifies, and deletes cloud provider load balancers. Operator Service as a Service utilities allow cloud products to be provided by reflecting traditional infrastructure resources onto custom resources.

The worker nodes 132 connect to the control plane 104 through the kube-api server 122 to maintain running pods as determined by the control plane. A node has a kubelet 134 that manages containers that are running in each pod. The kubelet is an agent running on the node that takes a set of pod specifications (PodSpecs) and ensures that the described containers are running. A kube-proxy 136 is a network proxy that implements a part of a Kubernetes Service. The kube-proxy allows communications to running pods from network sessions in the same or another cluster. The container workloads are performed using any supported container runtimes, such as Docker, containerd, unique Kubernetes CRIs (Container Runtime Interface), and CRI-O (Open Circuit Interconnection-based CRI).

As described in more detail below, multiple Kubernetes components are combined as a fully automated close-loop scaling service. The close-loop scaling service may be operated on VMware NSX-T Edge™ and VMware NSX-T Edge™ clusters among others. The service may be modified to apply to any custom resource driven by any custom metrics. The service uses a metric server, an autoscaler, and an operator as the three main components. The metric server is an implementation of a Kubernetes custom or external metrics interface, which extends the Kubernetes api server by API aggregation. The K8s metric server aggregates resource usage data and may be deployed in any cluster. Autoscaler is an independent component that sits in a loop, pulling metric values from the Kubernetes metric endpoints, reading the current replica number from a scale subresource as defined in the custom metric specification, and running autoscale algorithms to make decisions and scale a target replica number. The target replica number is eventually posted onto the specified custom resource through the scale subresource. The operator will define its set of custom resources, managing its lifecycles.

Existing Kubernetes autoscaling, or automatic scaling, solutions are based on core resources, such as deployments, or pods, with a focus on stateless workloads. The described autoscaling demonstrates a paradigm to integrate autoscaling with the custom resource and operator framework, enabling fully and partially automated network monitor and modification operations armed with distilled domain knowledge.

Figure 2:
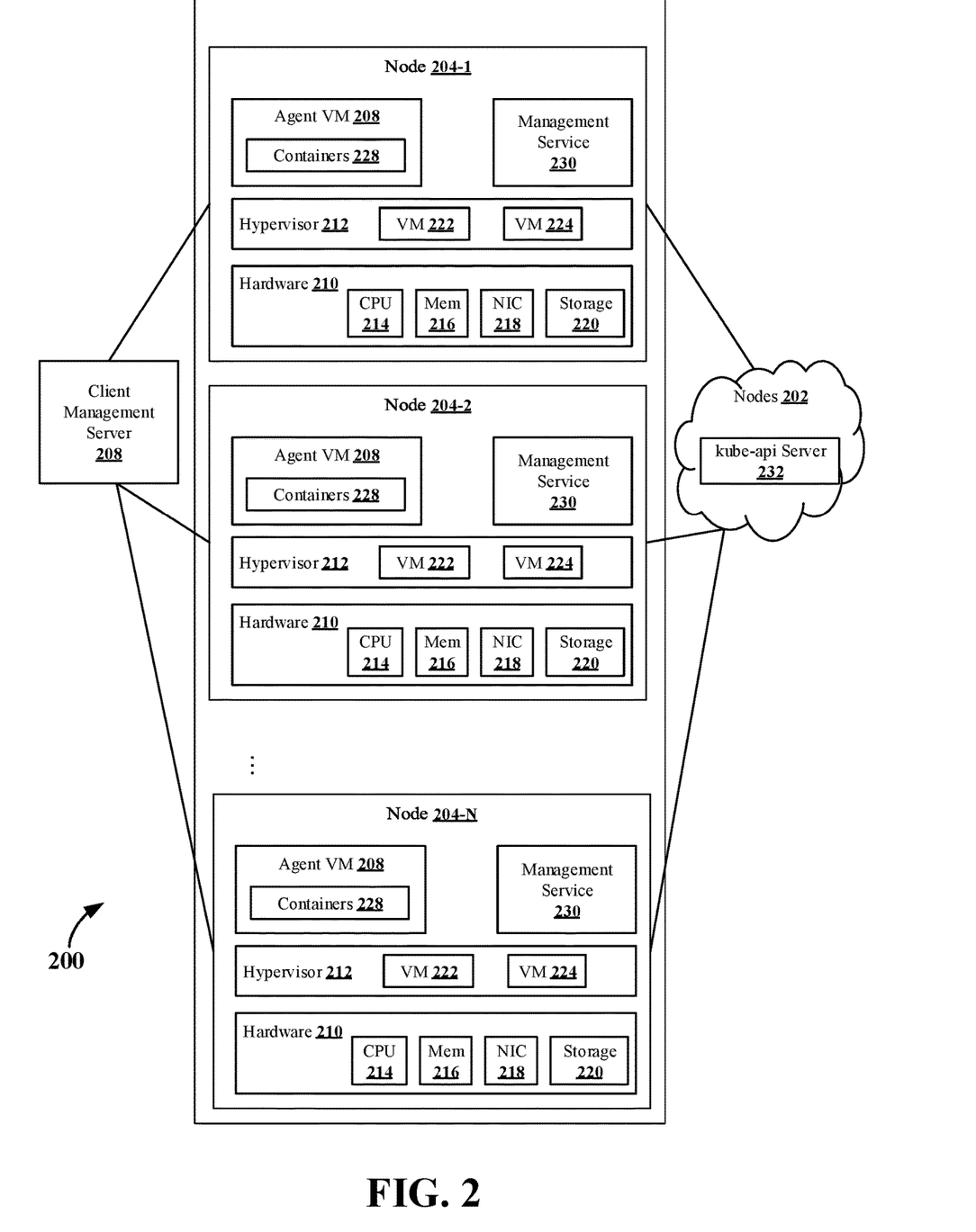
FIG. 2 is a block diagram of a distributed containerized processing system cluster in accordance with an embodiment of the invention

FIG. 2 illustrates a distributed containerized processing system 200 in accordance with an embodiment of the invention. As shown in FIG. 2, the distributed processing system 200 provides a cluster 206 of Kubernetes worker nodes 204-1, 204-2, 204-N, (where N is a positive integer) any one of which may also serve as a control plane and any one of which may support an operator and an autoscaler. The nodes are part of a logically defined cluster 206 of host computers that is managed by a cluster management server 208. A connection to other nodes 202 through the cloud allows local processing resources of the host computers 204 to be aggregated to form a shared cluster of processing resources, which allows the host computers 204, including any software entities running on the host computers, to operate on containerized workloads. A kube-api server 232 allows requests and replies to be communicated between the nodes 204 of the local cluster and other nodes 202 of other clusters.

The cluster management server 208 operates to manage and monitor the cluster 206 of host computers. The cluster management server may be configured to allow an administrator to create the cluster 206, add host computers to the cluster and remove host computers from the cluster. The cluster management server may also be configured to allow an administrator to change settings or parameters of the host computers in the cluster regarding the other worker and control plane nodes 202 with respect to the cluster. The cluster management server may be further configured to monitor the current configurations of the host computers and any virtual computing instances (VCIs) running on the host computers. As used herein, a VCI can be any isolated software entity that can run on a computer system, such as a software application, a software process, a virtual machine (VM), e.g., a VMware VM, or a virtual container, e.g., a Docker container. The monitored configurations may include hardware configurations of each of the host computers and software configurations of each of the host computers. The monitored configurations may also include VCI hosting information, i.e., which VCIs (e.g., VMs) are hosted or running on which host computers. The monitored configurations may also include information regarding the VCIs running on the different host computers in the cluster.

The cluster management server 208 may also perform operations to manage the VCIs and the host computers 204 in the cluster 206. As an example, the cluster management server may be configured to perform various resource management operations for the cluster, including VCI placement operations for either initial placement of VCIs and/or load balancing. The process for initial placement of VCIs, such as VMs, may involve selecting suitable host computers for placement of the VCIs based on, for example, memory and CPU requirements of the VCIs, the current memory and CPU load on all the host computers in the cluster and the memory and CPU capacity of all the host computers in the cluster.

In some embodiments, the cluster management server 208 may be a physical computer. In other embodiments, the cluster management server may be implemented as one or more software programs running on one or more physical computers, such as the host computers 204 in the cluster 206, or running on one or more VCIs, which may be hosted on any host computers. In some embodiments, the cluster management server 208 may orchestrate the distribution of containers or Pods and scales resources to service Pods or any other containerized workflows.

As illustrated in FIG. 2, the host computers 204 in the cluster 206 include hardware 210 and a hypervisor 212. The hardware 210 of a host computer includes hardware components commonly found in a physical computer system, such as one or more processors 214, one or more system memories 216, one or more network interfaces 218 and one or more local storage devices 220 (collectively referred to herein as "local storage"). Each processor 214 can be any type of a processor, such as a central processing unit (CPU) commonly found in a server. In some embodiments, each processor may be a multi-core processor, and thus, includes multiple independent processing units or cores. Each system memory 216, which may be random access memory (RAM), is the volatile memory of the host computer 204. The network interface 218 is an interface that allows the host computer to communicate with a network, such as the Internet. As an example, the network interface may be a network adapter. Each local storage device 220 is a non-volatile storage, which may be, for example, a solid-state drive (SSD) or a magnetic disk.

The hypervisor 212 of each host computer 204 is a software interface layer that, using virtualization technology, enables sharing of the hardware resources of the host computer by VCIs, such as VMs, running on the host computer. With the support of the hypervisor, the VCIs provide isolated execution spaces for guest software.

In the illustrated embodiment, a hypervisor 212 includes hosted VMs 222, 224. As an example, the VMs of a host computer in the cluster access data stored in the local storage resources of that host computer and execute any assigned workloads. Each host computer 204 in the cluster 206 may further includes agent VMs 226 with assigned containerized workflows 228, such as pods, running in the VM.

In order to manage the workflows, there is a management service 230 running on the host computers 204 in the cluster 206. The management services running on the different host computers in the cluster coordinate with each other, which requires exchange of configuration data between the management services. The configuration data includes which host computer needs to manage which Pods and which VMs to serve workflows from the control plane. When there is creation or removal of VMs, server functions, or any other Kubernetes resources, the configuration data will be changed. Then, each management service can see the change in the configuration data and take appropriate action in response to the configuration change.

Figure 3:
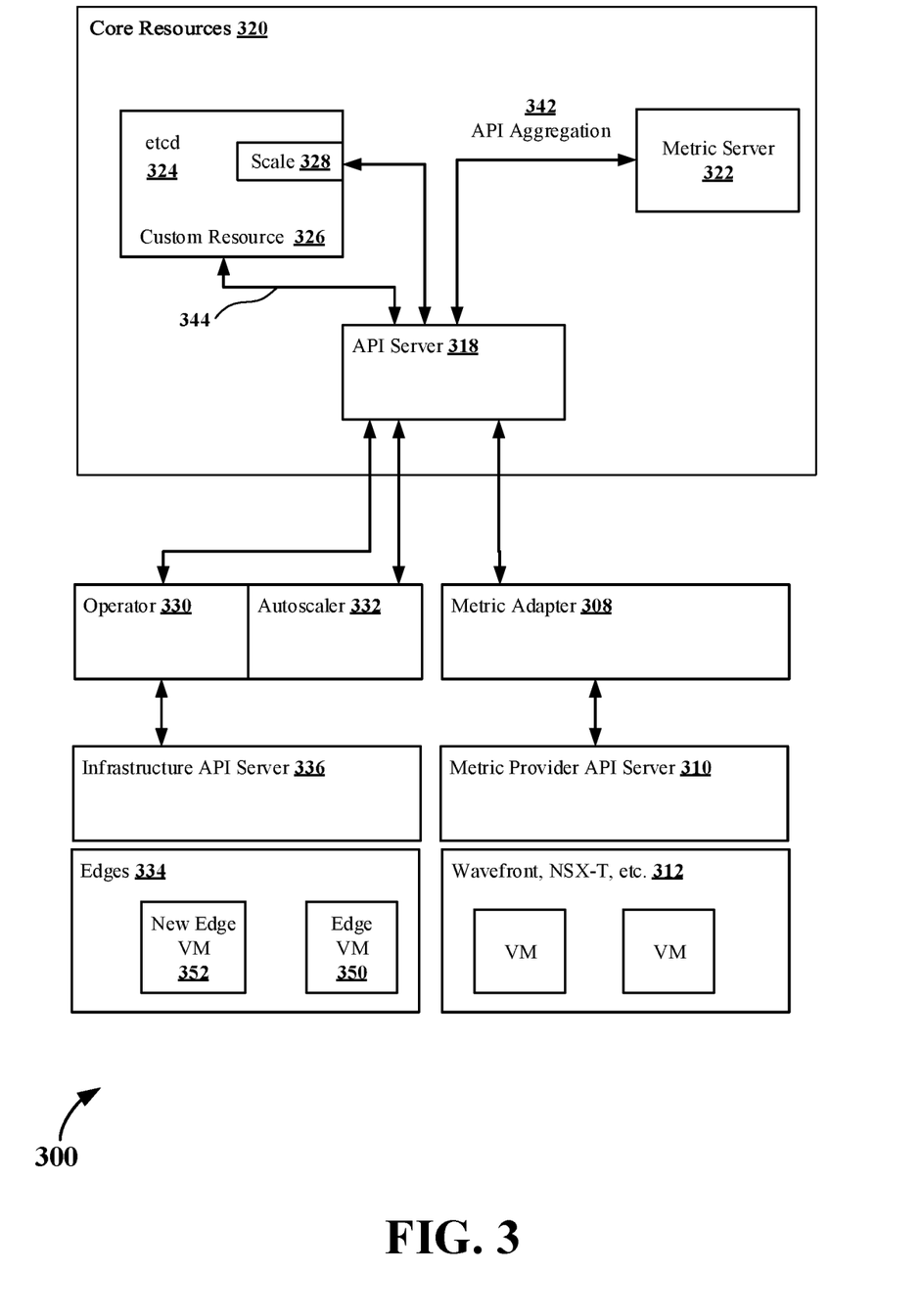
FIG. 3 is a diagram of an autoscaler applied to a containerized application handling system in accordance with an embodiment of the invention.

FIG. 3 is a block diagram of an autoscaling, or automatic scaling, system 300 for a Kubernetes system and suitable for application to the cluster of FIGS. 1 and 2 and other configurations. The autoscaling operations are driven by an operator 330 which may be implemented on a control plane or other node. The operator 330 is coupled to the infrastructure 334 which includes the worker nodes, such as NSX-T Edges. The operator is also coupled to one or more implementations of control plane nodes 320 through a Kubernetes API server 318. The control plane includes an etcd database 324 with custom resource 326 data and scale subresource 328 data of the custom resource. The control plane node 320 also includes a metric server 322 to serve values for additional metrics. All of the components of the control plane are connected to external components through the Kubernetes API server 318. The autoscaling system 300 also includes an autoscaler 332 that is coupled to the operator 330 and the control plane node 320 through the Kubernetes API server 318.

The metric server 322 pulls infrastructure metric values from a metric provider API server 310 coupled to the nodes of the infrastructure 334 using the infrastructure API server 336 and then serves the infrastructure metric values to the Kubernetes API server 318 on request through API aggregation 342. K8s API aggregation is provided on a Kubernetes API server using an aggregation layer. The K8s aggregation layer extends the Kubernetes API server with additional APIs beyond the core K8s APIs.

The metric server may also receive external metric values through API requests through the Kubernetes API server 318. An external metric adapter 308 may be configured to read metric values from any third party monitoring system and then inject those metric values into the metric server 322 to be accessible to the operator. A K8s metric adapter is a set of plugins that sync external metric provider metrics to the metric server 322 through the Kubernetes API server 318.

The operator 330 interacts with the Kubernetes API server 318 and an infrastructure API server 336 to reconcile custom resource 326 events and to manage corresponding infrastructure object lifecycles. The operator 330 includes the controllers and the manager for these functions. A K8s Operator is implemented as a collection of controllers and each controller watches a particular type of resource. For example, a controller may be configured to compare the current state of a custom resource to a desired state of the custom resource. The manager may be scaffolded by controller-runtime binaries, that define a set of custom resources, manage their life cycles by reconciling events, and make requests to the back end infrastructure.

The autoscaler 332 interacts with the Kubernetes API server 318 to: find out the number and characteristics of current object replicas, to read metric values, to calculate the desired number and characteristics of object replicas based on desired metric values that are selected for optimization purposes, and then to update the desired number of object replicas by posting back. A K8s replica is one of a number of identical pods in a replica set (ReplicaSet). The replicas in the set are defined with fields and a selector. In some embodiments, the autoscaler reads a set of specified metric values from the metric server 322 and then updates the scale subresource 328 of the custom resource 326 as stored in the etcd database 324. The autoscaler may be an independent component that implements various auto scaling algorithms. In some embodiments, the autoscaler takes inputs from the Kubernetes resource metrics API at a server 318 and a scale subresource 328 referenced by its specification: spec.scaleTargetRef.

Metrics exist in at least three groups in Kubernetes: resource metrics; custom metrics; and external metrics. These are available through Kubernetes APIs which are characterized by group, version and kind. The group: metrics refers to the resource metrics API which has two kinds, CPU and memory. The resource metrics are tightly coupled with pods and nodes. These may be used for pod-based autoscalers. The group: external metrics is used for external resources, i.e. resources outside of Kubernetes clusters.

The group: resource metrics, which has an API rooted at/apis/custom-metrics/[version], has extensibility and flexibility to target many different Kubernetes objects. The custom metric values may be parameterized by any combination of namespace, metric name, and kind of Kubernetes object. A label-based selector can be optionally provided to filter targets.

Metric values for custom metrics can have different meanings. As currently defined, the resource metric group supports average utilization (averageUtilization) and average value (averageValue). K8s average utilization refers to a percentage of CPU utilization in a pod while average value refers to the direct value of CPU utilization in the pod. Metrics are also available for memory utilization in the pod. The custom metric group supports both average value and direct value for an object resource type and only average value for a pod resource type, yet the external metric group supports both average value and direct value. However, these definitions may be changed or adapted to suit particular implementations.

If there is a strict mapping between a custom resource and infrastructure objects, then custom metrics can be used. One example of such an infrastructure object is a VMware NSX-T Edge 350 that supports multiple worker nodes. If there is no such strict mapping but a custom resource is to be scaled based on some external measurements, then external metrics can be used. This may be the case for cluster API machine objects and front end service QPS (Queries per Second). Custom metric target types may be preferred over external metrics because it may be easier to secure Custom Metrics APIs. External metrics APIs potentially allow access to any metric, so that a cluster administrator may expose internal metrics through the external metric APIs.

Subresources are provided by K8s definitions for uses beyond original resources. Subresources extend the original resource. Custom resources support a status subresource and a scale subresource. The status subresource has one field in its specification: Replicas, to indicate the status for particular replicas. The scale subresource has two fields in its status: Replicas and Selector, to indicate the number of replicas and the selector that characterizes each replica. The scale subresource 328 is also a virtualized object instead of a concrete one. Therefore, scale does not correspond to any object in the etcd database 324. Scale is served to requesters on APIs. Scale may also serve as the interface of a particular resource by specifying the mapping between scale fields and the main resource fields.

The abstraction of scale as a virtualized object decouples the concrete resources from the scale concern. As a result, the autoscaler may scale resources without concern as to the real mechanism that will create or destroy back end resources. The autoscaler determines the target replica and selected replica and the actual physical effect of the scaling is outside the autoscaler. The following is an example of implementing a virtual resource named edge-sample in the API server. This virtual resource does not require a concrete object in the etcd database 324. The Kubernetes JSON (Javascript Object Notation) sequence below represents status and scale subresources.

```
{
    "kind": "Scale", ..,
    "metadata": {. "name": "edge-sample", .., },
    "spec": { "replicas": 1 },
    "status": { "replicas": 0, .., }
}
```

An example data flow using the architecture of FIG. 3 begins with the Metric Provider API server 310 which provides metric values of internal 334 and external 312 resources to the Metric adapter 308. These are used to generate metric values by the Metric Server 322. The metric values will typically include values for the scale subresource 328. The autoscaler 332 obtains the metrics through API aggregation 342 from the metric server 322 and the metrics for scale subresource 346 through the API server 318 of the core resource which is the control plane node 320. The operator 330 in cooperation with the autoscaler then causes a change in the values for the custom resources 326 through the connection 344 between the operator and the core custom resource 326. This may result in a change in the virtualized objects, such as an additional Edge VM 352 being added to the existing Edge VMs 350 in the NSX-T worker nodes.

The operator 330 reads the expected value for the scale subresource 328 from its managed custom resource 326, and the current scale subresource number from the infrastructure 334. It is then able to reconcile the gap between the two scale subresource values by actively creating or destroying the corresponding infrastructure resource VMs 350, 352.

An example autoscaler is described below. A custom resource autoscaler (referred to as "cmas") may be used to scale a number of edge virtual machines. A similar technique may be used when the custom resource is edge clusters. In this example, the edge VMs are in the NSX-T edge configuration, but any other suitable VM may be scaled.

In this example, the metrics server is used to read the desired metric values periodically and then to provide the metric values to the autoscaler through the Kubernetes API server. The metrics are subresources of a Kubernetes custom resource which are presently status and scale, however, additional custom resources and subresources may be defined and be the subject of the technique described herein. To read the metric values, the metrics server may send edge router APIs, such as NSX-T APIs to obtain capacity and usage metric values on additional objects, such as load balancers, edge nodes, routers, etc.

The operator, such as an NSX-T Edge Operator, reads the collected infrastructure configurations, for examples: endpoints and credentials from a configuration map (e.g. K8s ConfigMap). Both an edge and edge cluster custom resource are defined by the operator and both custom resources have definitions for both status and scale subresources so that autoscaling may be performed using these subresource metrics. The custom resources may be defined using a tool such as a K8s kubebuilder. In K8s, a definition statement in which scale.spec.replicas corresponds to edge.spec.replicas may be written as follows:

"//+kubebuilder:subresource:scale:specpath=.spec.replicas, statuspath=.status.replicas,selectorpath=.status.selector", etc.

The example autoscaler, as described herein, retrieves a metric called "externalmetric-A" in the metric server, which is deployed in namespace custom-metrics. Additional metric values may be used for a more complex evaluation of the system. In the below example, the retrieved value for "externalmetric-A is 42. A typical query has the following result:

```
kubectl get --raw "/apis/external.metrics.k8s.io/v1beta1
/namespaces/custom-metrics/externalmetric-A"
| jq .
{
    "kind": "ExternalMetricValueList",
    "apiVersion": "external.metrics.k8s.io/v1beta1",
    "metadata": {
        "selfLink":
"/apis/external.metrics.k8s.io/v1beta1/
    namespaces/custom-metrics/externalmetric-A"
    },
    "items": [
        {
            "metricName": "externalmetric-A",
            "metricLabels": {
                "foo": "bar"
            },
            "value": "42"
        }
    ]
}
```

In this example, the custom resource is named edge. This is defined as referring to NSX-T edge VMs, however other resources may be defined instead. This is used as an example and any other Custom Resource may be used. As with any custom resource, edge has scale and status subresources. In this example, there is one replica for edge and the scale subresource is as follows:

```
kubectl get --raw "/apis/nsx.cna.vmware.io/v1alpha1
/namespaces/default/edges/edge-sample/scale" | jq .
{
            "kind": "Scale",
            "apiVersion": "autoscaling/v1",
            "metadata": {
                "name": "edge-sample",
                "namespace": "default",
    "selfLink": "/apis/nsx.cna.vmware.io/v1alpha1
/namespaces/default/edges/edge-sample/scale"
    },
            "spec": {
                "replicas": 1
            },
    "status":       {
                "replicas": 0
```

-continued

```
             "selector": "a=b"
             }
}
```

The autoscaler, referred to as cmas for custom metric autoscaler, operates using the metric labeled as "externalmetric-A" which is used to represent any one or more desired internal or external metric values. The Edge Custom Resource, which has been defined to relate to a number of Edge VMs, will be scaled by the number for "externalmetric-A." In this example, the "external metric-A" is set as less than or equal to 30 on average per Edge VM. In the example below, the "externalmetric-A" is aggregated and the result that is reported by the API to the control plane is 42. To achieve the target of 30, another Edge VM is needed. The autoscaler adjusts the value of the desired scale replica from 1 to 2. This is shown in the Kubernetes code sequence below:

```
kubectl get --raw "/apis/nsx.cna.vmware.io/v1alpha1
/namespaces/custom-metrics/edges/edge-sample/scale" | jq .
{
                "kind": "Scale",
                "apiVersion": "autoscaling/v1",
                "metadata": {
                "name": "edge-sample",
                "namespace": "custom-metrics",
                "selfLink": "/apis/nsx.cna.vmware.io/v1alpha1
                /namespaces/custom-metrics/edges/edge-
sample/scale"
},
"spec": {
                "replicas": 2
},
"status":      {
                "replicas": 0,
                "selector": "a=b"
                }
}
```

In the example of FIG. 3, the operator 330 may be implemented in the control plane 104 or in one of the nodes 132. The autoscaler 332, which may also be implemented in the control plane 104 or in one of the nodes 132, has increased the replica specification (spec.replica) from 1 to 2. When the operator receives this change, the operator reconciles this change by creating one more edge virtual machine 352 and registering it into NSX-T. The reconciliation is due to the limit of 30 for the external metric value. Because the reply to the external metric API request was 42, the system object, spec replicas, was scaled up from 1 to 2. This brings the metric to 21 per replica which is within the limit of 30.

Figure 4:
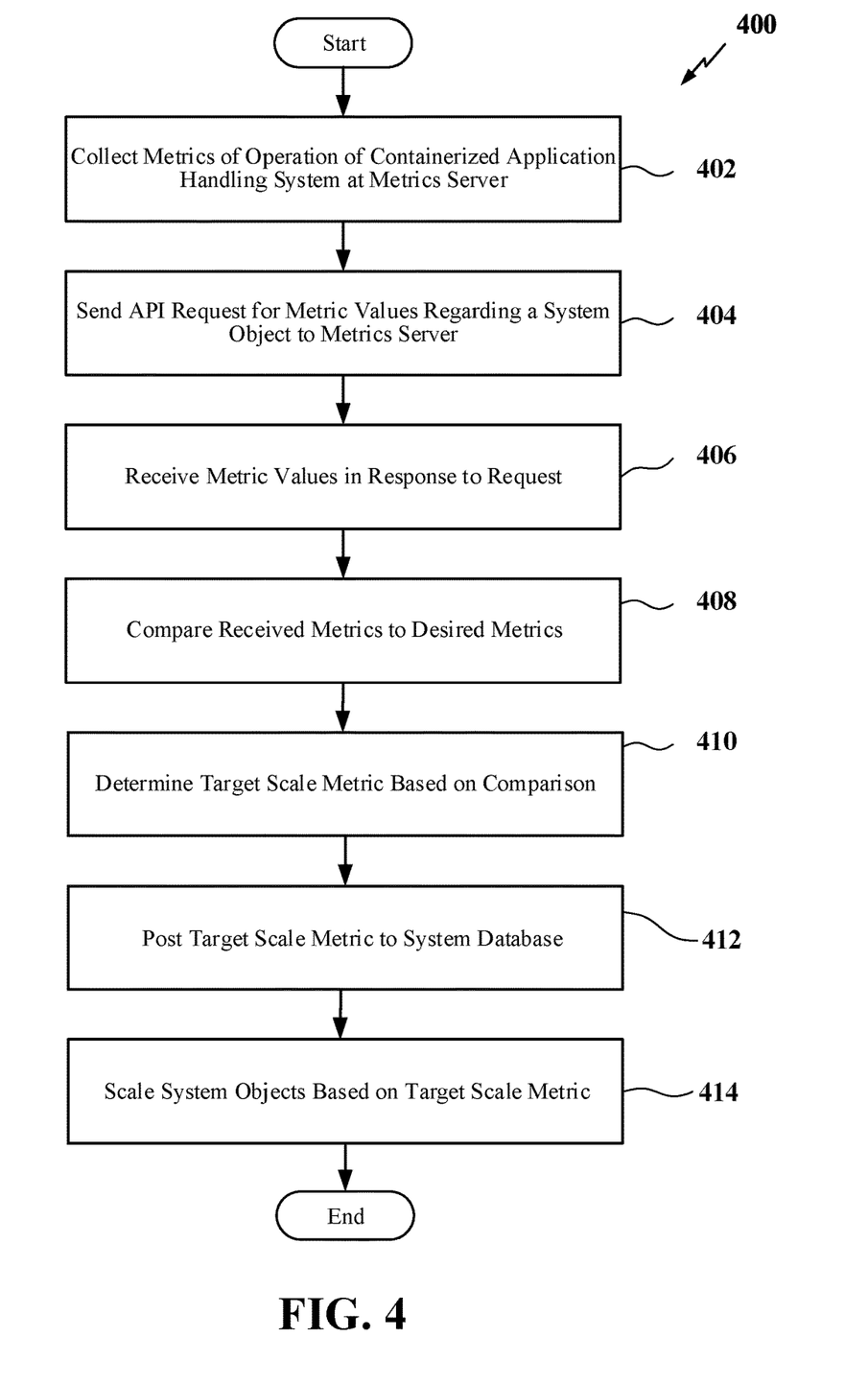
FIG. 4 is a process flow diagram of a method for autoscaling an object of the containerized application handling system based on metric values for a Custom Resource in accordance with an embodiment of the invention.

FIG. 4 is a process flow diagram of autoscaling using custom metrics as described above. At block 402, metric values are collected, for example at a metric server of the containerized application handling system. These metric values concern the operation of the containerized application handling system, but the metric values may be internal to the system or from a third party monitoring system. The metric server may be a part of the control plane of the containerized application handling system and may collect the metric values through aggregating metrics requests in the form of APIs. The metrics may be external or internal. As described above, in some embodiments, the metrics are status and scale subresources of a custom metric and these metrics are usage metrics. Other metrics may be used as they become available. The status and scale metrics provide usage information such as average utilization or average value for processing and memory resources of a system object, such as the usage of a VM as discussed above. The metric values may be capacities and usage of one or more system resources, such as a load balancer, worker nodes, and routers. In some embodiments the metrics are defined as Custom Metrics of a Custom Resource in a Kubernetes containerized application handling system having subresources including status and scale.

At block 404, an operator or an autoscaler sends an API request for the system metric values to the metric server. When the metric server is a part of a Kubernetes system control plane, then the APIs are sent to a control plane API server. The API server provides the reply from the metric server in response to the API request and the metric values are received by the autoscaler that makes the request.

At block 406, the metric values are received at the autoscaler from the control plane metric server. In this example, the metric values are the scale and status of the custom resource. In particular, the utilization of processing and memory may be received as direct values or average values. These have been defined as averageUtilization and averageValue for some K8s resources. Scale indicates a current number of the system object that is available or active in the containerized application handling system.

Using the received values at block 410, the autoscaler compares the received current metric value or values, if there are more than one, to desired metric values, such as a desired utilization. These desired values may be desired for optimal operation, resource allocation, or other purposes. In the example above, the received metric value for "externalmetric-A" was 42 and the desired metric value was 30. As represented in the example of "externalmetric-A" the systems and methods described herein may be adapted to suit any of a variety of different metrics.

At block 412, a target scale metric value is determined based on the comparison and then at block 414, this target scale metric value is posted to the system database. As an example, the target scale value may be posted to the replica custom resource in the custom resources of the etcd database.

Using this comparison, at block 414, the autoscaler automatically scales a preselected system object as defined by the resource. The change in the preselected object may be made by an operator which is a software operator with access to change system resources. In the example above, the object was VMs that were increased from 1 to 2.

In terms of a Kubernetes system, the objects may be object replicas, such as VM replicas that run the containerized applications of the system. The operator manages the number of VM replicas and the lifecycles of the VM replicas. By changing the number of object replicas, the selected metric values are reconciled to the metric values that were received at block 408. For confirmation, the autoscaler may make a second request for the metric values returning to block 404.

In some embodiments, the scaled object is a virtualized object. In the example above, the virtualized object is counted using a scale subresource as defined in the Kubernetes containerized application handling system. The scale subresource is selected as a number of VM replicas. Using the system and methods described herein the scale of any custom resource may be scaled using any desired metric that is supported by custom resource APIs. In this example, the number of VM replicas is scaled based on "externalmetric-A" which represents any desired metric. Suitable example metrics include utilization or processor or memory resources but other metrics may be used instead.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, and have a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer.

As described above, the virtual machines include a guest operating system in which at least one application runs. These embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

At least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for autoscaling a custom resource of a containerized application handling system comprising:
sending an API (Application Programming Interface) request from an autoscaler to a control plane of the containerized application handling system for a metric value defined for a system object of the custom resource of the containerized application handling system, wherein the custom resource is an endpoint in an API that stores a collection of API objects of a kind as defined by a definition of the custom resource;
receiving the metric value of the custom resource from the control plane in response to the API request;
comparing the received metric value to a desired metric value of the custom resource;
determining a target scale metric value defined for the system object in the custom resource based on the comparing by the autoscaler;
posting the determined target scale metric value of the custom resource to a database of the containerized application handling system that updates the desired metric value of the custom resource to the determined target scale metric value by changing a replicas field of a scale subresource of the custom resource that is enabled by a custom resource definition API; and
scaling the number of system objects of the custom resource by an operator of the containerized application handling system based on the posted target scale metric value.

2. The method of claim 1, wherein the system object is a virtual machine object and wherein scaling comprises managing virtual machine object lifecycles.

3. The method of claim 1, wherein the system object is a replica of a virtual object machine, wherein scaling comprises changing a number of replicas, and wherein the replicas run containerized applications of the containerized application handling system.

4. The method of claim 1, wherein the system object is a replica defined as one of a number of identical pods in a replica set of the containerized application handling system, and wherein the pods run containerized applications of the containerized application handling system.

5. The method of claim 1, wherein scaling comprises reconciling the target scale metric value to a received scale metric value, and wherein the received scale metric value is the subresource of the custom resource that indicates a current number of the system objects in the containerized application handling system.

6. The method of claim 1, wherein the custom resource is defined as having the scale subresource that indicates a number of system objects and a status subresource that includes utilization of the system objects.

7. The method of claim 6, wherein the scale subresource is a number of virtual machine replicas.

8. The method of claim 1, further comprising collecting metric values of operation of the containerized application handling system at a metric server, and sending the metric values in response to the API request.

9. A non-transitory computer-readable storage medium containing program instructions for a method for autoscaling a custom resource of a containerized application handling system, wherein execution of the program instructions by one or more processors of a computer causes the one or more processors to perform steps comprising:
sending an API (Application Programming Interface) request from an autoscaler to a control plane of the containerized application handling system for a metric value defined for a system object of the custom resource of the containerized application handling system, wherein the custom resource is an endpoint in an API that stores a collection of API objects of a kind as defined by a definition of the custom resource;
receiving the metric value of the custom resource from the control plane in response to the API request;
comparing the received metric value to a desired metric value of the custom resource;
determining a target scale metric value defined for the system object in the custom resource based on the comparing by the autoscaler;
posting the determined target scale metric value of the custom resource to a database of the containerized application handling system that updates the desired metric value of the custom resource to the determined target scale metric value by changing a replicas field of a scale subresource of the custom resource that is enabled by a custom resource definition API; and
scaling the number of system objects of the custom resource by an operator of the containerized application handling system based on the posted target scale metric value.

10. The non-transitory computer-readable storage medium of claim 9, wherein the system object is a virtual machine object and wherein scaling comprises managing virtual machine object lifecycles.

11. The non-transitory computer-readable storage medium of claim 9, wherein the system object is a replica of a virtual object machine, wherein scaling comprises changing a number of replicas, and wherein the replicas run containerized applications of the containerized application handling system.

12. The non-transitory computer-readable storage medium of claim 9, wherein the system object is a replica defined as one of a number of identical pods in a replica set of the containerized application handling system, and wherein the pods run containerized applications of the containerized application handling system.

13. The non-transitory computer-readable storage medium of claim 9, wherein scaling comprises reconciling the target scale metric value to a received scale metric value, and wherein the received scale metric value is the subresource of the custom resource that indicates a current number of the system objects in the containerized application handling system.

14. The non-transitory computer-readable storage medium of claim 9, wherein the custom resource is defined as having the scale subresource that indicates a number of system objects and a status subresource that includes utilization of the system objects.

15. The non-transitory computer-readable storage medium of claim 14, wherein the scale subresource is a number of virtual machine replicas.

16. The non-transitory computer-readable storage medium of claim 9, wherein the steps further comprise collecting metric values of operation of the containerized application handling system at a metric server, and sending the metric values in response to the API request.

17. An apparatus comprising:
memory; and
at least one processor configured to:
send an API (Application Programming Interface) request from an autoscaler to a control plane of a containerized application handling system for a metric value defined for a system object of a custom resource of the containerized application handling system, wherein the custom resource is an endpoint in an API that stores a collection of API objects of a kind as defined by a definition of the custom resource;

receive the metric value of the custom resource from the control plane in response to the API request;

compare the received metric value to a desired metric value of the custom resource;

determine a target scale metric value defined for the system object in the custom resource based on the comparing by the autoscaler;

post the determined target scale metric value of the custom resource to a database of the containerized application handling system that updates the desired metric value of the custom resource to the determined target scale metric value by changing a replicas field of a scale subresource of the custom resource that is enabled by a custom resource definition API; and scale the number of system objects of the custom resource by an operator of the containerized application handling system based on the posted target scale metric value.

18. The apparatus of claim 17, wherein the system object is a virtual machine object and wherein the at least one processor is configured to manage virtual machine object lifecycles.

19. The apparatus of claim 17, wherein the system object is a replica of a virtual object machine, wherein the at least one processor is configured to change a number of replicas, and wherein the replicas run containerized applications of the containerized application handling system.

20. The apparatus of claim 17, wherein the at least one processor is configured to reconcile the target scale metric value to a received scale metric value, and wherein the received scale metric value is the subresource of the custom resource that indicates a current number of the system objects in the containerized application handling system.

\* \* \* \* \*